(12) United States Patent
Russell

(10) Patent No.: US 11,292,080 B2
(45) Date of Patent: Apr. 5, 2022

(54) PREPARATION OF COMPOSITE RODS

(71) Applicant: CUTTING & WEAR RESISTANT DEVELOPMENTS LIMITED, Rotherham (GB)

(72) Inventor: Mark Russell, Sheffield (GB)

(73) Assignee: CUTTING & WEAR RESISTANT DEVELOPMENTS LIMITED, Sheffield (GB)

(*) Notice: Subject to any disclaimer, the term of this patent is extended or adjusted under 35 U.S.C. 154(b) by 883 days.

(21) Appl. No.: 15/774,335

(22) PCT Filed: Nov. 9, 2016

(86) PCT No.: PCT/GB2016/053502
§ 371 (c)(1),
(2) Date: May 8, 2018

(87) PCT Pub. No.: WO2017/081460
PCT Pub. Date: May 18, 2017

(65) Prior Publication Data
US 2020/0246909 A1 Aug. 6, 2020

(30) Foreign Application Priority Data
Nov. 9, 2015 (GB) .................................. 1519765

(51) Int. Cl.
*B23K 26/359* (2014.01)
*B23K 26/00* (2014.01)
(Continued)

(52) U.S. Cl.
CPC ........ *B23K 26/0006* (2013.01); *B23K 1/0008* (2013.01); *B23K 26/359* (2015.10);
(Continued)

(58) Field of Classification Search
None
See application file for complete search history.

(56) References Cited

U.S. PATENT DOCUMENTS 965,720 A 7/1910 Limpus
1,977,128 A * 10/1934 Hawkins .............. B23K 31/025
219/146.51
(Continued)

FOREIGN PATENT DOCUMENTS

AU 755889 B2 1/2003
CN 102157633 A 8/2011
(Continued)

OTHER PUBLICATIONS

Li, et al., "Thermal stresses and their implication on cracking during laser melting of ceramic materials", Acta Materialia 52 (2004) 4385-4398. Abstract Only.
(Continued)

*Primary Examiner* — Monica A Huson
*Assistant Examiner* — Kelsey C Grace
(74) *Attorney, Agent, or Firm* — Meunier Carlin & Curfman LLC

(57) ABSTRACT

The present invention relates to a method of producing a composite rod from a braze material and a sheet of material comprising cermet. The method comprises scoring a surface of the sheet to produce at least one line of localised stress and subsequently causing the sheet to break along the line of localised stress, thereby to produce a plurality of cermet chunks. The cermet chunks can be combined with the braze material to produce the composite rod. In a particular embodiment, the sheet of material may be a used cermet cutting tip.

20 Claims, 2 Drawing Sheets

(51) Int. Cl.
  *B23K 1/00* (2006.01)
  *B23K 31/02* (2006.01)
  *B23K 35/02* (2006.01)
  *B23K 35/32* (2006.01)
  *B23K 35/40* (2006.01)
  *B23K 101/20* (2006.01)
  *B23K 103/00* (2006.01)

(52) U.S. Cl.
  CPC ........ *B23K 31/025* (2013.01); *B23K 35/0227* (2013.01); *B23K 35/327* (2013.01); *B23K 35/40* (2013.01); *B23K 2101/20* (2018.08); *B23K 2103/52* (2018.08)

(56) References Cited

U.S. PATENT DOCUMENTS

| | | | |
|---|---|---|---|
| 2,137,471 A | | 11/1938 | Zublin |
| 2,833,638 A | | 5/1958 | Owen |
| 3,304,604 A | | 2/1967 | Quaas |
| 3,626,256 A | * | 12/1971 | Brown ................ G01L 1/2293 257/417 |
| 3,790,353 A | | 2/1974 | Jackson |
| 4,488,673 A | * | 12/1984 | Hopper, Jr. ............... B23K 1/20 228/122.1 |
| 6,353,205 B1 | | 3/2002 | Izard |
| 6,894,249 B1 | | 5/2005 | Hauer et al. |
| 2001/0026736 A1 | | 10/2001 | Lynde |
| 2002/0124707 A1 | | 9/2002 | Izard |
| 2006/0185908 A1 | | 8/2006 | Kembaiyan et al. |
| 2012/0193152 A1 | | 8/2012 | Russell |
| 2014/0220309 A1 | | 8/2014 | Vogt et al. |

FOREIGN PATENT DOCUMENTS

| | | |
|---|---|---|
| CN | 103189164 B | 7/2016 |
| JP | 2014069233 | 4/2014 |
| JP | 2014223630 A | 12/2014 |

OTHER PUBLICATIONS

Tsai, Chwan-Huei et al., "Laser cutting of thick ceramic substrates by controlled fracture technique", Journal of Materials Processing Technology 136 (2003) 166-173. Abstract Only.

International Preliminary Report on Patentability issued for International Application No. PCT/GB2016/053502, dated May 15, 2018.

International Search Report and Written Opinion dated Feb. 1, 2017, from International Application No. PCT/GB2016/053502, 10 pages.

Search Report under Section 17(5) dated Apr. 28, 2017, from Application No. GB1519765.0, 3 pages.

* cited by examiner

PREPARATION OF COMPOSITE RODS

This invention relates to composite rods for hard facing of tools, including but not limited to down-hole tools for use in the oil and gas drilling industry.

BACKGROUND

It is well known to hardface tools by applying hard coatings to surfaces of the tools that are expected to bear against abrasive surfaces such as geological formations or to cut hard materials such as metals. This improves the service lifetime of the tools. The coatings used in hardfacing typically comprise chunks of a hard cermet material such as tungsten carbide (WC), titanium carbide (TiC) or polycrystalline diamond (PCD) and a braze material that wets both the hard material and the surface to be hardfaced, thereby attaching the hard material to the surface.

A particularly cost effective method of hardfacing involves the use of a composite rod having chunks of cermet embedded within a matrix of braze material. Such a composite rod can be placed above a surface to be hard-faced and heated above the melting temperature of the braze material (e.g. using an oxyacetylene torch), so that the braze material and cermet chunks flow onto the surface before the braze material re-solidifies.

It is desirable for chunks of hard material to be regularly sized. For some applications it is also desirable for them to have sharp edges whereby the hard-facing is abrasive in nature. This may be useful, for example, on milling tools for cutting metal casings of well bores in down hole applications. For other applications the chunks could be more rounded in shape and smaller, so that the hard-faced surface is simply more hard-wearing. Hard wearing surfaces are used on down hole drilling equipment and agricultural equipment such as plough shears, i.e. components that engage with geological formation.

Composite rods having preshaped tetrahedral chunks of tungsten carbide are available from Cutting & Wear Resistant Developments Ltd, under the trade name Sharkstooth. However, the requirement for preshaped chunks of WC makes these rods relatively expensive to produce. Composite rods are also produced using chunks of tungsten carbide retrieved from waste machining tool bits and the like. Such chunks are achieved by crushing the bits in mechanical crushers, and then sieving the output thereof to obtain roughly equally-sized parts. However, this process results in about 70% wastage of the raw product because much is crushed to such small flakes that they cannot be used.

The present invention seeks to at least partially mitigate the problems of the prior art.

BRIEF SUMMARY OF THE DISCLOSURE

In accordance with the present invention there is provided a method of producing a composite rod from a braze material and a sheet of material comprising cermet, the method comprising:
   scoring a surface of the cermet sheet to produce at least one line of localised stress;
   causing the sheet to break along the line of localised stress, thereby to produce a plurality of cermet chunks; and
   combining the cermet chunks with the braze material to produce the composite rod. This aspect provides a convenient method of breaking cermet sheets into chunks of predetermined sizes and shapes, with very little wastage.

In another aspect the invention provides a method of hardfacing a surface to be hardfaced using a sheet of material comprising cermet, the method comprising:
   scoring a surface of the sheet to produce at least one line of localised stress;
   causing the sheet to break along the line of localised stress, thereby to produce a plurality of cermet chunks; and
   brazing the cermet chunks to the surface to be hardfaced. Optionally, the cermet chunks may be spot welded to the surface to be hardfaced before brazing the cermet chunks to the surface to be hardfaced.

In an embodiment the action of scoring the surface causes at least a portion of the sheet to crack and ultimately to break without the application of further external forces. This embodiment provides for rapid breakage of cermet sheets into cermet chunks.

In some embodiments at least a portion of the sheet is caused to break along the line of localised stress by the application of an external force. Scoring the sheet and subsequently applying an external force may facilitate predictable breakage of the sheet. Optionally, the external force comprises the action of a mechanical crusher or press. The mechanical crusher or press may be a hydraulic or pneumatic press having a chisel attached thereto. This allows the press to apply a force along the axis along which it is desired to break the cutting tips. By providing a the line of localised stress on the component, even if it does not break directly thereby, once even a relatively small force is applied, the sheet not only breaks but breaks along the line of localized stress. Thus little force is needed, resulting in saving of energy used by operating the crusher, and less breaking of the sheet occurs along lines other than the lines of localized stress, whereby less wastage of the raw material is experienced.

In another embodiment a thermal stress is created in the cermet sheet, thereby to at least assist with causing the sheet to break along the line of localised stress. Optionally, the thermal stress is created by means of a laser.

In an embodiment the cermet comprises tungsten carbide.
In another embodiment the cermet comprises titanium carbide.

Optionally, the material comprising cermet further comprises an ultra-hard material on a surface of the cermet. Such ultra-hard materials may provide particularly good wear resistance and abrasiveness. Further optionally the ultra-hard material comprises polycrystalline diamond (PCD) or cubic boron nitride (CBN).

In an embodiment the scoring of the sheet is effected by a first laser. Optionally, the first laser may be a $CO_2$ laser or a diode laser.

In an embodiment, the thermal stress is at least partially created by a second laser different from said first laser. This embodiment may increase the probability that a cermet sheet will break without the need for application of an external force. Furthermore, the first and second lasers may be applied simultaneously, thereby reducing the time needed to break the cermet sheet into a plurality of cermet chunks.

In an embodiment the power of the first laser is between 1 and 3 kW. Preferably the power of the first laser is between 1.9 and 2.5 kW. The scoring may be performed at a speed of between 10 and 30 mm/s. Preferably, the scoring is performed at a speed between 10 and 20 mm/s or between 15 and 25 mm/s. Optionally, the spot width of the laser is between 0.1 mm and 0.6 mm In an embodiment the scoring of the cermet sheet is effected by loading the sheet onto a table of a laser apparatus, directing a laser at the table, and moving the table relative to the laser.

Optionally, the cermet sheet comprises a used machining tool bit.

According to another aspect of the invention there is provided a composite rod produced according to a method as described above, wherein the composite rod comprises cermet chunks having score lines along at least one edge thereof. Optionally the score lines comprise a residue of a laser score line. The residue of a laser score line may comprise a region along an edge of the chunk that has been melted and re-solidified.

BRIEF INTRODUCTION OF THE DRAWINGS

An embodiment of the invention is further described hereinafter, by way of example, with reference to the accompanying drawings, in which.

DETAILED DESCRIPTION

The production of composite rods having cermet chunks of predetermined sizes and shapes may be made more cost effective by using recycled cermet, for example recycled WC. However, recycled WC is not widely available in the sizes typically used in composite rods, so it is necessary to break sheets of recycled WC into smaller chunks of sizes suitable for composite rods. This can be achieved by simply crushing the WC sheets and sieving the resulting crushed WC to separate the chunks of the desired size. However, this approach has been found to result in significant wastage.

Figure 1:
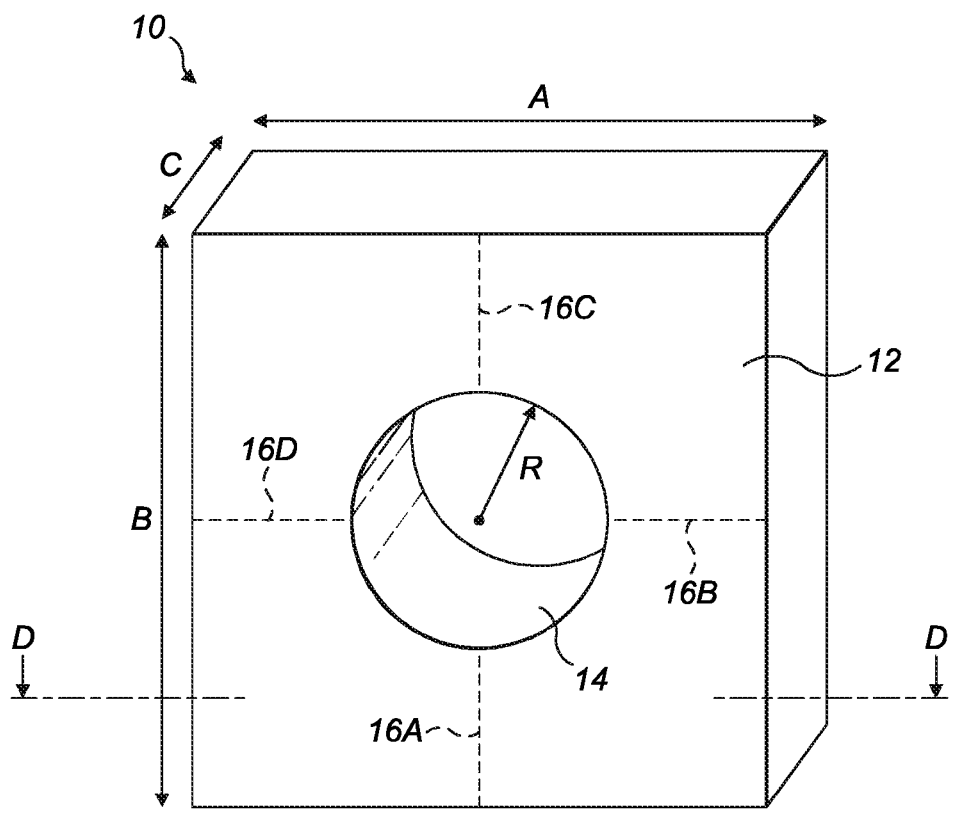
FIG. 1 is a perspective view of a cutting tip for use in a method of manufacture of a composite rod in an embodiment of the present invention.

FIG. 1 shows a cermet sheet, which is a used cutting tip 10 for a machining tool (not shown). The cutting tip 10 is a generally cuboidal piece of a metal cutting grade of WC comprising WC grains in a metal matrix material. The metal matrix material may be cobalt.

Tip 10 has a cylindrical hole 14 passing through the centre of the largest faces of the cuboid. In the illustrated embodiment dimensions A and B are 19 mm, dimension C is 6.35 mm and dimension R is 7.9 mm. The cutting tip 10 is therefore somewhat larger than the chunks of WC that are used in conventional composite rods, so it is necessary to break the tip 10 into smaller chunks before it can be used in the manufacture of a composite rod.

Although a used tungsten carbide cutting tip is illustrated in FIG. 1, the skilled person will understand that the present invention is applicable to various other cermet sheets, including titanium carbide or chrome carbide cutting tips, or sheets of tungsten carbide, titanium carbide, chrome carbide that are not cutting tips. Such sheets may be new or recycled. The process of the present invention is also applicable to cermet cutting tips or other cermet sheets that have ultra-hard materials embedded therein. For example, the present invention is applicable to cermet sheets having a layer of cubic boron nitride (CBN) or polycrystalline diamond (PCD) attached to all or part of a surface thereof. Such sheets may be new or recycled cutting tips having CBN or PCD on one or more corners of a cutting surface of the tip.

It will be understood that the dimensions given above, and indeed throughout this specification, are non-limiting examples. It will also be understood that cermet sheets of substantially any shape could be used as part of the method of the present invention; the cutting tip 10 shown in FIG. 1 is merely one common shape of cutting tip, and the skilled person will be aware that various other shapes are also available. Furthermore, the presence of cylindrical hole 14 is not essential to the present invention. The hole is used in the first use of the cutting tip 10 to fix the bit to a tool body. Usually, one of the corners actually forms the cutting edge of the bit, and the bit is capable of being rotated to bring different corners into play as they wear.

In an embodiment of the present invention the cutting tip 10 may be scored along lines 16A-16D by application of a laser. For example, a diode laser at having a power output of between 1 and 3 kW and a spot width of between 0.1 mm and 0.6 mm may be passed along the lines 16A-D at a speed of between 10 and 30 mm/s. Preferably, the power of the laser is between 1.9 and 2.5 kW and the speed is between 15 and 25 mm/s.

In another embodiment the cutting tip 10 may be scored by application of a $CO_2$ laser along lines A-D. The $CO_2$ laser may have a power of between 1 and 2 kW and a spot width of approximately 0.4 mm may be passed along the lines 16A-D at a speed of between 10 and 20 mm/s. The skilled person will be aware that other lasers, for example solid state crystal lasers including neodymium lasers and ytterbium lasers could also be used for scoring cermet sheets.

The application of a laser causes localised melting and vaporisation of the material in the region surrounding lines 16A-D. This results in a small amount of material being removed along the lines 16A-D, which locally reduces the strength of the cutting tip 10 and forms a notch at which a crack may be expected to initiate when the cutting tip 10 is subjected to stress.

In another embodiment, a score along lines 16A-D could be formed using other known cutting techniques such as spark erosion, wire cutting or cropping.

Figure 2:
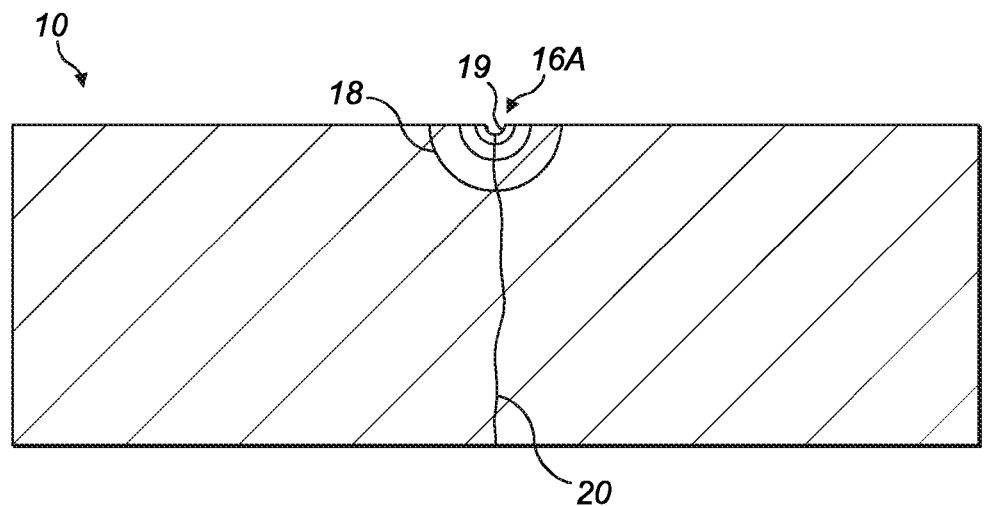
FIG. 2 is a cross section through the cutting tip shown in FIG. 1.

FIG. 2 shows a cross section through cutting tip 10 along line D-D after a laser has been applied along line 16A. As shown in FIG. 2, a notch 19 is present along line 16A as a result of the vaporization of material when the laser was applied. It will be understood that the notch 19 could have been formed using alternative cutting techniques such as spark erosion, plasma cutting, wire cutting or cropping.

Advantageously, using a laser to form notch 19 may also result in the initiation of a crack 20 through cutting tip 10. Without wishing to be bound by any particular theory, the applicant believes that the application of the laser causes localized heating of the solid material around lines 16A-D. FIG. 2 shows approximate temperature contours 18 on a cross section through tip 10 soon after the application of the laser along line 16A. FIG. 2 shows contours 18 relatively close together, indicating a high temperature gradient, in the region nearest to notch 19, and the contours 18 become progressively further apart as the distance from notch 19 increases. The high temperature gradient causes stress within the tip 10, because the thermal expansion of the material is greater in the hotter region of the tip (i.e. nearest to line 16A) than in the cooler regions. As mentioned above, notch 19 locally weakens the cutting tip 10, thereby increasing the intensity of the stress caused by thermal expansion of the solid material around notch 19.

The applicant believes that, because of the brittle nature of WC (and indeed other cermets), the stress caused by the thermal expansion and local weakening typically causes a crack 20 to propagate at least part of the way through tip 10. If the crack propagates all of the way through tip 10 (as shown in FIG. 2) then the tip breaks along the line 16A. Alternatively, if the crack only propagates part of the way through the tip 10, then the tip 10 may not break. The tip will however have been significantly weakened along the line 16A, so the stress required to break the tip will be significantly reduced.

Notch 19, which runs along the length of line 16A, is a line of localised stress on the surface of cutting tip 10. Within the scope of the present invention a line of localised stress is considered to be a line along which the stress in a cermet sheet would be locally increased (compared to the stress that would be expected if the line of increased stress was not present) when the cermet sheet is subjected to an external force. However, it will be understood that it is not always necessary for an external force to actually be applied to the cutting tip to break it. For example, the application of a laser alone may be sufficient to break the cermet sheet.

Figure 3:
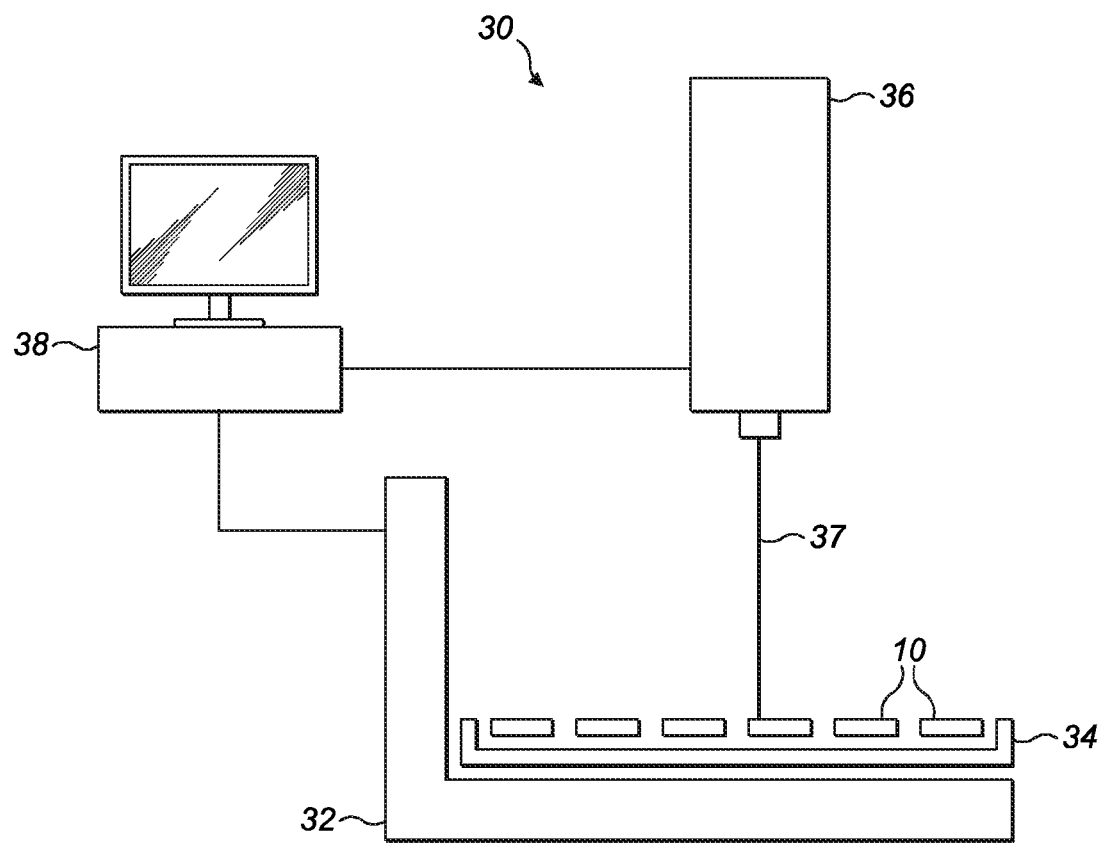
FIG. 3 is a laser apparatus for use in a method of manufacture of a composite rod in an embodiment of the present invention.

FIG. 3 shows a schematic representation of a laser apparatus 30. The laser apparatus 30 may be used for scoring cutting tips 10, or other cermet sheets, along lines that it is intended to break the cermet sheets along. Laser apparatus 30 comprises a laser capable of providing a beam of suitable power, wavelength and focus width to initiate cracking of tungsten carbide cutting tips 10 or other cermet sheets. For example, the laser may be a diode laser or a $CO_2$ laser having a power output of between 1 and 2 kW and a spot width of between 0.1 and 0.6 mm.

The laser 36 is orientated so that it can direct a beam 37 towards table 32, which is movable in a plane normal to the direction of the beam under the control of a computer 38 having a user interface that allows a user to pre-programme movement of the table. The computer is also operable to control the laser 36. To score cutting tips 10 using laser apparatus 30 an operator loads a tray 34 with a plurality of cutting tips 10, and places the tray 34 onto table 32. The operator then sets the laser power, and optionally other operating parameters of the laser 36, as well as the movement pattern of table 32, via the user interface of computer 38. The cutting tips 10 may be arranged in a predetermined pattern on tray 34, so that the movement pattern selected by the user results in the laser beam 37 scoring each of the cutting tips along the lines that it is desired to break them along, which are lines 16A-D in the illustrated embodiment. Once the table 32 has completed the movement pattern, the laser is switched off (indeed, the duration for which the laser is activated may be set to be the same as the length of time needed for the table 32 to complete the movement pattern). The tray 34 may then be removed from the table 32. As described above, scoring a cutting tip 10 with a laser 36 may result in a crack initiating from notch 19, which may propagate all the way through the cutting tip 10, causing the cutting tip to break. However, the crack may only propagate part of the way through some of the cutting tips 10. Accordingly, it may be necessary to either apply an external force to the cutting tips 10 to cause the unbroken tips to break, or to perform a sieving or manual sorting operation to separate the broken tips from the unbroken tips. Indeed, a sieving or manual sorting operation may be performed before the application of an external force, so as to only apply the external force to the unbroken cutting tips. However, in some embodiments, the number of cutting tips that remain unbroken after scoring by the laser is sufficiently small that it is more economical to remove the unbroken cutting tips for alternative recycling than to apply an external force to break them.

It is feasible to randomly distribute the tips 10 in the tray 34. While this results in a random distribution of shapes cut from the tips, they are still of relatively uniform overall shape since they will still be breaking along lines parallel the line 37 of application of the laser and the direction of movement of the tray 34.

As mentioned above, in some embodiments the scoring is not performed with a laser and is instead performed by wire cutting, spark erosion or cropping. In these embodiments the scoring is unlikely, in itself, to cause the cutting tips 10 to break. Accordingly, it is usually necessary to apply an external force to substantially all of the cutting tips if the scoring is not performed using a laser.

Figure 4:
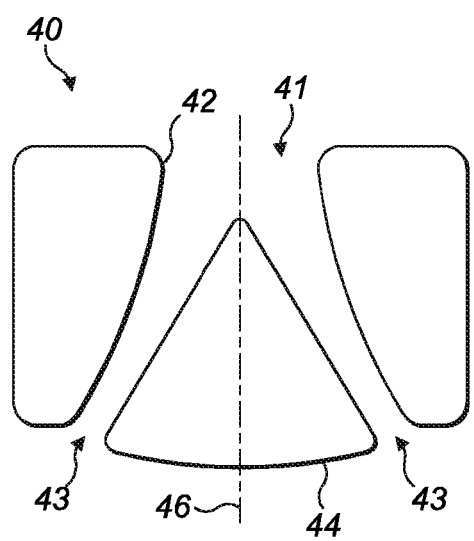
FIG. 4 is a crusher for use in a method of manufacture of a composite rod in an embodiment of the present invention.

If an external force is to be applied to some or all of the cutting tips 10 then they may be inserted into wear plate crusher 40, shown schematically in FIG. 4, via inlet 41. Wear plate crusher 40 comprises a conical first wear plate 44, which wear plate rotates about axis 46, and stationary concave wear plate 42. A small annular gap 43 is defined between the lower end of concave wear plate 42 and conical wear plate 44, which gap provides the outlet from the wear plate crusher 40. It may be the case that the vertical distance between concave wear plate 42 and conical wear plate 44 is adjustable, so that the size of the annular gap 43 is adjustable.

When the cutting tips 10 are inserted into wear plate crusher the rotation of conical wear plate they are subjected to various mechanical forces due to impact on the wear plates 42, 44 and shearing action between the wear plates 42, 44. Because the scoring of the cutting tips resulted in a line of localised stress the mechanical forces applied in the crusher 40 are significantly more likely to break the cutting tips along planes passing thorough lines 16A-D than along other planes. Accordingly, scoring of the cutting tips and then applying an external force to them results in more predictable breakage of the cutting tips. This facilitates the production of cermet chunks of predetermined sizes and shapes.

It will be understood that the wear plate crusher 40 shown in FIG. 4 is merely one example of a device that may be used to apply an external force to fully break the cutting tips 10 once they have been scored. For example, the cutting tips could be broken by in mechanical or hydraulic press, or an operator may break the cracked cutting tips by hand. The process used to apply an external force to break the cutting tips after scoring will depend on the method by which they were scored. For example, the external force required to break cutting tips that have been scored by wire cutting may be greater than that required to break cutting tips that have been scored by a laser, because application of a laser typically causes a crack to propagate at least part of the way through the cutting tip, thereby weakening it.

In another embodiment a second laser may be provided in addition to the first laser, the first laser having a power and wavelength suitable for scoring cermet sheets and the second laser having a larger spot size than the first laser. The second laser is configured to generate additional thermal stress in the region around the notch produced by the first laser, thereby causing the crack to propagate further through the cermet sheet. The first and second lasers are preferably, applied simultaneously, but it would also be possible to apply them sequentially. Advantageously, this embodiment may increase the probability that the application of the lasers alone will cause the cermet sheets to break. Other methods of inducing thermal stress in the cermet sheets may also be used to encourage crack propagation after the cermet sheet has been scored by a laser. Such methods may obviate the need for the application of an external force. A system similar to that shown in FIG. 3, but with an additional laser (not shown) may be provided for use in conjunction with this embodiment.

Once the cutting tips 10, or indeed any other cermet sheets, have been broken into cermet chunks of suitable size for use in composite rods they may be combined with a braze material to form composite rods. This may be performed by various methods that will be well known to the skilled person. For example, the cermet chunks may be washed, placed into a rod-shaped mould and heated to a predetermined temperature. Optionally, a molten flux may then be poured into the mould. A braze material, for example in powder form may then be placed into the mould, and the mould, cermet chunks and braze material may be heated to sufficiently high temperature to melt the braze material, thereby causing the braze material to flow around and coat the cermet chunks. A composite rod is then formed once the braze material has cooled and solidified. It will be understood that the mould may be made from graphite or another suitable material that facilitates removal of the composite rod from the mould. Methods for producing composite rods from chunks of hard material such as cermets and braze material are know from U.S. Pat. Nos. 3,304,604, 2,137,471 and 1,977,128.

Depending upon the nature of the cermet sheet and the resulting cermet chunks, it may be necessary to wash the cermet chunks before they are used to form a composite rod. Furthermore, it is often the case that cutting tips are provided with a coating which reduces their wettability by braze material. Accordingly, if cutting tips are used as the cermet sheet then it may be necessary to remove the coating, either before the cutting tips are broken into the cermet chunks or before the cermet chunks are combined with the braze material to produce the composite rod. The coating may be removed by either chemical or mechanical means. As will be understood by the skilled person, the precise method used to remove the coating will depend on the particular type of coating that has been applied to the cutting tips.

In another embodiment the cermet chunks may be brazed to a tool without first being combined with a braze material to form a composite rod. For example, the cermet chunks may be spot welded to a surface of a tool to be hardfaced, thereby providing a weak attachment between the surface and the cermet chunks, and a braze material may be subsequently applied to fill the gaps between the cermet chunks and to firmly attach the cermet chunks to the surface of the tool.

A particular advantage of the present invention is that it provides a way of producing cermet chunks of predetermined sizes from used cermet sheet (e.g. used cutting tips), without the wastage caused by simply crushing the cermet sheet and discarding the chunks that are not of the required size. A composite rod having excellent wear and abrasion properties can therefore be produced at a relatively low cost.

Example 1

The applicant has used the laser scoring to break used cemented WC cutting tips made from tungsten carbide and small amounts of titanium carbide and tantalum carbide, cemented in cobalt. The cutting tips were rhombohedron shaped having two rhombus-shaped faces with corner angles of 100 degrees and 80 degrees and rhombus side length of 16 mm, and four 16 mm by 6.35 mm rectangular faces perpendicular to the rhombus shaped faces. The inserts had a cylindrical hole through the centre of the rhombi with a diameter of 6.35 mm. The tips were broken along two planes, each plane passing through the centre of the rhombi and being perpendicular to one of the pairs of sides of the rhombi.

One axis on each of the planes along which the tips were to be cut was scored using a Trumpf Trudisk Yb:YAG thin disk laser. The laser was set to a power output of 2 kW and a laser spot size of 0.6 mm, and was moved relative to the cutting tips at 20 mm/sec. The scoring took place in pure Argon cutting gas.

Scoring alone caused over 80% of the inserts to break along both planes, resulting in WC chunks that were ready to be combined with braze material to produce composite rods. The non-broken inserts were broken along the axes by applying an external force with a hydraulic press, after which they broke along the planes to produce chunks of the required size. It was observed that relatively low stress (compared to that which would have been required had scoring not been performed) was required to break the cutting tips that did not break during scoring.

The cermet chunks combined with braze material to produce composite rods.

Within the scope of the present application a "cermet" is considered to be a material comprising ceramic (such as tungsten carbide or titanium carbide) embedded in a metal (such as cobalt). It will be understood that such cermets are referred to throughout this application by the name of the ceramic that is present without specifying which metal it is embedded in.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of producing a composite rod from a braze material and a sheet of material comprising cermet, the method comprising:
   scoring a surface of the sheet with a laser to produce a thermal stress and at least one line of localized stress;
   causing the sheet to break along the line of localized stress, thereby to produce a plurality of cermet chunks; and
   combining the cermet chunks with the braze material to produce the composite rod.

2. The method as claimed in claim 1, wherein scoring the surface causes at least a portion of the sheet to crack and ultimately to break without the application of further external forces.

3. The method as claimed in claim 1, wherein at least a portion of the sheet is caused to break along the line of localized stress by the application of an external force.

4. The method as claimed in claim 3, wherein the external force comprises an action of a mechanical crusher or press.

5. The method as claimed in claim 1, wherein the thermal stress is created in the cermet sheet, thereby to at least assist with causing the sheet to break along the line of localized stress.

6. The method as claimed in claim 1, wherein the cermet comprises tungsten carbide.

7. The method as claimed in claim 1, wherein the cermet comprises titanium carbide.

8. The A method as claimed in claim 1, wherein the material comprising cermet further comprises an ultra-hard material on a surface of the cermet.

9. The method as claimed in claim 8, wherein the ultra-hard material comprises polycrystalline diamond (PCD) or cubic boron nitride (CBN).

10. The method as claimed in claim 1, wherein scoring of the sheet is effected by a first laser.

11. The method as claimed in claim 10, wherein the first laser comprises a $CO_2$ laser.

12. The method as claimed in claim 10, wherein the first laser comprises a diode laser.

13. The method as claimed in claim 10, wherein the thermal stress is at least partially created by a second laser different from said first laser.

14. The method as claimed in claim 10, wherein the power of the first laser is between 1 and 3 kW.

15. The method as claimed in claim 10, wherein the scoring is performed at a speed of between 10 and 30 mm/s.

16. The method as claimed in claim 10, wherein the spot width of the laser is between 0.1 mm and 0.6 mm.

17. The method as claimed in claim 10, wherein the scoring of the sheet is effected by loading the sheet onto a table of a laser apparatus, directing a laser at the table, and moving the table relative to the laser.

18. The method as claimed in claim 1, wherein the sheet comprises a used machining tool bit.

19. A method of hardfacing a surface to be hardfaced using a sheet of material comprising cermet, the method comprising:
   scoring a surface of the sheet with a laser to produce a thermal stress and at least one line of localized stress;
   causing the sheet to break along the line of localized stress, thereby to produce a plurality of cermet chunks; and
   brazing the cermet chunks to the surface to be hardfaced.

20. The method as claimed in claim 19, wherein the cermet chunks are spot welded to the surface to be hardfaced before brazing the cermet chunks to the surface to be hardfaced.

* * * * *